United States Patent [19]

Frutschi et al.

[11] Patent Number: 5,267,288
[45] Date of Patent: Nov. 30, 1993

[54] POWER STATION INSTALLATION

[75] Inventors: Hansulrich Frutschi, Riniken; Hans Wettstein, Fislisbach, both of Switzerland; Kurt Kugeler, Jülich, Fed. Rep. of Germany

[73] Assignee: Asea Brown Boveri Ltd., Baden, Switzerland

[21] Appl. No.: 939,735

[22] Filed: Sep. 2, 1992

[30] Foreign Application Priority Data

Sep. 5, 1991 [CH] Switzerland ............... 2611/91-9

[51] Int. Cl.$^5$ ............................................. G21C 15/00
[52] U.S. Cl. ................................... 376/402; 376/391; 60/644.1
[58] Field of Search ............... 60/644.1; 376/391, 402; 976/DIG. 306, DIG. 308, DIG. 310

[56] References Cited

U.S. PATENT DOCUMENTS

| 3,583,156 | 6/1971 | Schabert | 60/36 |
| 4,166,362 | 9/1979 | Laurent | 60/39.18 R |
| 4,466,249 | 8/1984 | Frutschi | 60/648 |

FOREIGN PATENT DOCUMENTS 0410118 1/1991 European Pat. Off.
0424660 5/1991 European Pat. Off.
2253254 6/1975 France.

Primary Examiner—Donald P. Walsh
Assistant Examiner—Frederick H. Voss
Attorney, Agent, or Firm—Burns, Doane, Swecker & Mathis

[57] ABSTRACT

In a power station installation which is designed as a combined installation, i.e. consists of a gas turbine group (2, 3, 4, 5, 6, 8) and of a steam cycle (13, 16, 17, 18, 19, 20) downstream of the gas turbine group, the steam rate being generated in a waste heat boiler (13) by heat exchange with the exit gases from the gas turbine (5), a heat exchanger (7), which is a component of a closed cycle, with a high-temperature reactor (12) as the heat source is placed downstream of the last compressor (4) of the gas turbine group and upstream of the combustion chamber (8). In this heat exchanger (7), the compressed air undergoes vigorous caloric processing before it flows into the downstream combustion chamber (8) in which the final caloric processing of the hot gases for charging the gas turbine (5) is accomplished. The essential point here is that the pollutant emissions of any type, in particular $CO_2$, are effectively minimized by the extensive substitution by the heat provided via the high-temperature reactor.

10 Claims, 1 Drawing Sheet

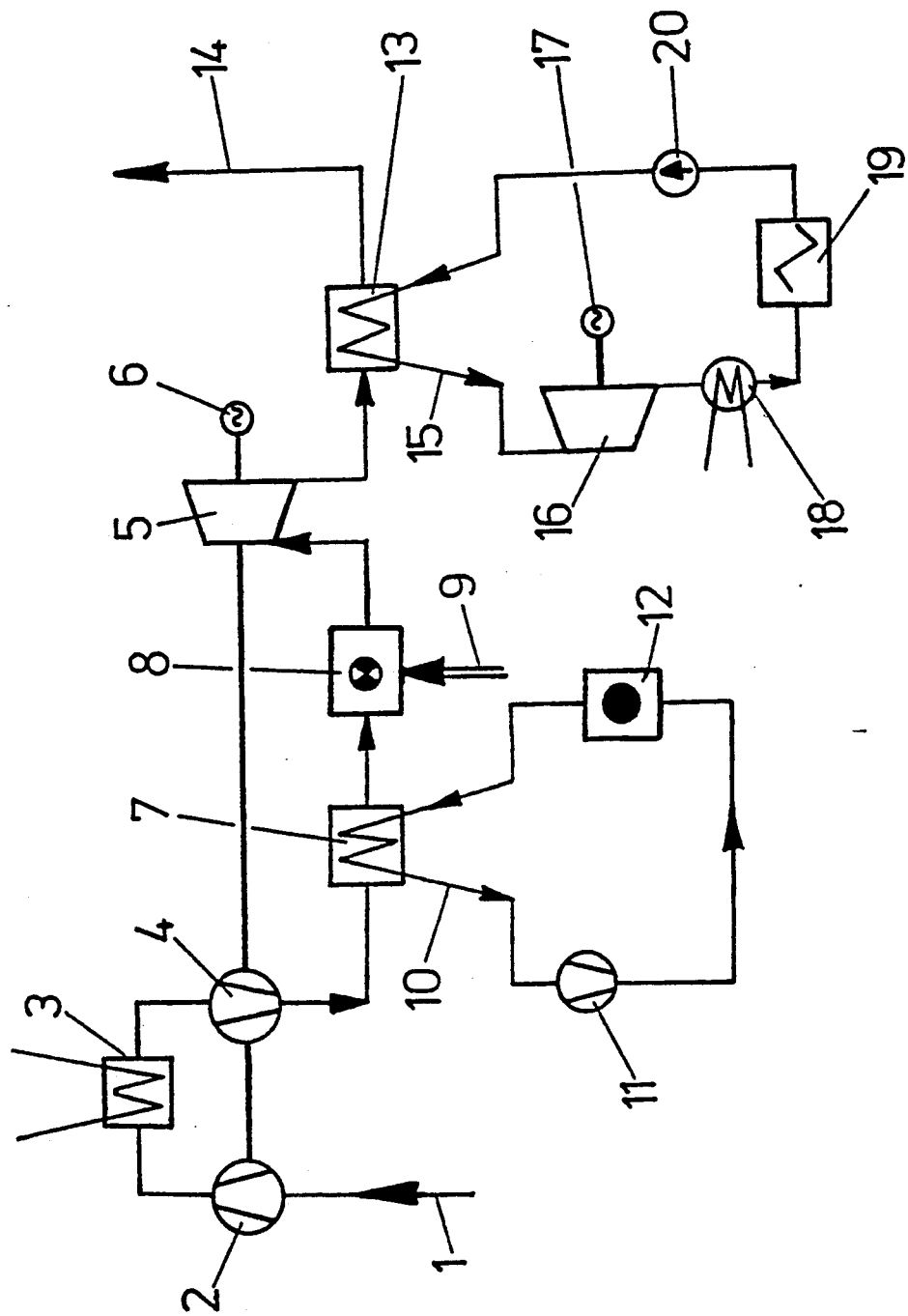

POWER STATION INSTALLATION

BACKGROUND OF THE INVENTION

1. Field of the Invention

The present invention relates to a power station installation in accordance with the preamble of claim 1. It also relates to a process for operating such an installation.

2. Discussion of Background

The HTR (high-temperature reactor) promises the highest possible safety potential and very good utilization of the fissile materials. Accordingly, the declared aim is to make it feasible. Numerous studies have shown that the investment costs to obtain economic efficiency in a cross comparison with other concepts are at present still very high.

If a direct cycle installation is desired, i.e. a helium turbine cycle integrated into the reactor cooling section, very high costs result, since all components of this helium cycle must, for safety reasons, be enclosed in a pressure vessel made, for example, of prestressed concrete. These components comprise the helium turbine set, the recuperator, the precooler and, if appropriate, an intercooler, as well as the extensive connecting lines and valves for control. A particular hazard potential in a gas turbine system integrated into the cooling cycle of the reactor core are possible large pressure transients in the event of an internal fracture of a coaxial line, of a support plate of a heat exchanger or of spontaneous blade loss of turbine or compressor. Such pressure transients could put internal insulations, liners and core internals at a mechanical risk. However, water ingress in the event of a defective precooler or intercooler also represents a hazard potential which can hardly be ignored.

Another solution according to the state of the art is the so-called two-cycle installation. In this case, helium as the reactor coolant is circulated by means of fans and the thermal reactor output is thus transferred to steam generators integrated on the primary side. In this case, the risk of pressure transients is largely averted, because the cooling circulation has no large pressure differences between its components reactor, fan and steam generator heating surfaces. The risk of an ingress of steam or water into the primary cycle is, however, rather greater than in the case of the direct helium turbine cycle, because the pressure of the steam or water far exceeds that of the helium.

One solution, advantageous in safety terms, would be a separation of the primary reactor cooling cycle from the secondary conversion cycle by a helium/helium heat exchanger. This would be integrated together with the helium circulation fans and the reactor core into a steam vessel. The conversion cycle would be a helium turbine system. However, in such an arrangement, the achievable efficiency of the conversion of the thermal reactor output into electric power would be relatively low, because the helium turbine can be subjected only to about 800° C. This and the high specific costs of a helium turbine installation with a necessarily highly efficient recuperator and intercooling of the compression are obstacles to the implementation of such a solution.

SUMMARY OF THE INVENTION

Accordingly, one object of the invention, as defined in the claims, is to propose a novel feasible approach, in a power station installation of the type described at the outset, to the integration of a high-temperature reactor which is operatively connected to the other cycles.

The perhaps greatest advantage of the invention is to be regarded as the fact that in this way a substitution of fossil fuels by nuclear energy, particularly for reducing the production of $CO_2$, becomes possible. According to the invention, this can be achieved by the provision of a hybrid nuclear/fossil power station, in which the thermal output of the nuclear reactor provides approximately up to 50% of the preheating of the combustion air of a gas turbine/steam turbine power station, this being effected by a helium/air heat exchanger.

A further essential advantage of the invention is based in the safety aspects: the risk of rapid pressure transients and water ingresses is thereby defused or minimized.

The economical advantages result, on the one hand, from the low specific costs of the combined installation as a conversion system and, on the other hand, from its efficiency beyond any competition. Starting from the state of the art, approximately half the fuel energy can, by means of the invention, be provided in the nuclear form, and the other half in the fossil form, for example natural gas, both primary energies being converted into electricity at an efficiency of about 50%. In the near future this efficiency may rise to about 60%.

The afterheat removal can be effected via the air circulation of the gas turbine of the combined process, and as a reserve system a helium/helium heat exchanger or helium/air heat exchanger can be provided. Accordingly, water can be completely eliminated.

The advantages accomplished by such a hybrid system of HTR/combination installation can be circumscribed as follows, this list not being complete:
- high efficiency of up to 60% of the overall system;
- high proportion of nuclear energy in the total heat consumption of the power station, at a rate of up to 60% more;
- significant reduction of the $CO_2$ emission by means of nuclear energy, also possible by means of solar energy via a receiver;
- avoidance of water ingress in the HTR;
- low reactor inlet temperature of the coolant in the HTR;
- potential for using the nuclear energy installations economically even in small power units;
- all engineering improvements of the combined process fully benefit the overall installation;
- optimized power/heat coupling by steam tapping;
- coupling of two standard products (modular HTR, combined installation) is possible, whereby the system becomes cheaper;
- relatively simple control behavior of the overall system;
- further running of the combined installation at full output is possible with the reactor at a standstill;
- an accident due to air ingress can be controlled due to $p_{He} \geq p_{air}$ and due to coated fuel elements.

Advantageous and expedient further developments of the achievement of the object in accordance with the invention are defined in the further dependent claims.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein all elements not required directly for understanding the invention have been omitted and the direction of flow of the media is indicated by arrows, and wherein the sole figure shows: a diagram of a conventional combined process in operative connection with a modular HTR.

DESCRIPTION OF THE PREFERRED EMBODIMENTS AND COMMERCIAL UTILITY

Referring now to the drawing, wherein like reference numerals designate identical or corresponding parts, FIG. 1 shows a diagram of a power station installation which consists, on the one hand, of a gas turbine group with a downstream steam turbine group and, on the other hand, this combined installation is connected to a high-temperature reactor (HTR). The gas turbine group in principle consists of a compressor, combustion chamber and gas turbine. In the present case, the air 1 drawn in is passed to a first compressor 2 in which a first compression takes place. This compressed air then flows through a heat exchanger 3, in which a caloric partial expansion of this air takes place. Downstream of this heat exchanger 3, the air is passed through a second compressor 4, in which the final compression of the air takes place. On the way to the combustion chamber 8, the compressed air flows first through a heat exchanger 7, wherein a first caloric processing of the compressed air to give hot gas takes place. The connections with respect to the last-mentioned heat exchanger are discussed further below. After these hot gases have passed through the heat exchanger 7, they flow into the already mentioned combustion chamber 8, in which the final caloric processing of the hot gases up to a temperature of about 1200° C. takes place. The fuel 9 used for operating the combustion chamber 8 can be a gaseous and/or liquid fuel. The hot gases processed in the combustion chamber 8 are charged to a gas turbine 5 in the subsequent process, the gas turbine here being coupled to a generator 6. Logically, the gas turbine exit gases are then no longer blown off, but flow through a waste heat boiler 13 in which the steam generation 15 for charging to a steam turbine 16 is provided by heat exchange. The summarily shown waste heat boiler 13 is preferably a two-pressure waste heat boiler. Of course, a single-pressure waste heat boiler can also be used. The former has, however, the advantage over the latter that the temperature of the flue gases 14 can be lowered further, so that the efficiency of the installation is enhanced. If desired, the waste heat boiler 13 can also be extended by additional firing (not shown) which can process the gas turbine exit gases up to a higher temperature level. The last-mentioned measure proves to be advantageous whenever the power output of the installation has to be increased in the event of load peaks. It is also possible to use a three-pressure waste heat boiler. Thus, predominantly high-pressure steam and low-pressure steam are generated from the thermal energy of the gas turbine exit gases, which steam charges the steam turbine 16 or further steam turbine groups which are not shown. The steam turbine 16 is coupled to a further generator 17, it being advantageous to provide coupling of the output of the steam turbine 16 to the same generator 6 of the gas turbine 5. For example by generating two steam pressures, the potential of the gas turbine exit gases can be utilized in an optimized manner, in such a way that these exit gases which, at the end of the gas turbine process, are still at a temperature of about 500° C., can be lowered down to about 100° C. After leaving the steam turbine 16, the expanded steam then flows into a condenser 18, where water or air can be used as the coolant. By means of a pump which is not shown, the condensate flows into a preheater 19 and from there into a feedwater tank, likewise not shown, and a deaerator. After passing through these stages, the condensate has been processed to such a degree that it can be recycled via a further transfer pump 20 into the waste heat boiler 13 for repeated vaporization. Regarding the heat exchanger 7 upstream of the combustion chamber 8, this is a component of a closed further cycle which is thermally supported by a high-temperature reactor 12. The working medium used here is preferably helium, this gas being heated in the high-temperature reactor 12 up to about 1000° C. The medium 10 may alternatively be composed of sodium or carbon dioxide. This heat is transferred in the heat exchanger 7 to the compressed air flowing through the latter, this working air having already undergone, before entering the combustion chamber 8, a caloric processing up to about 950° C., so that the combustion chamber 8 then only has to accomplish the remaining temperature increase. The lowering of the helium temperature by the heat exchange is in fact quite large since, after the heat exchange, the helium is then at a temperature of only 250°-350° C. Downstream of this heat exchanger 7, the helium flows through a circulation fan 11 before the gas thus treated is introduced into the high-temperature reactor 12, in which a helium temperature of about 1000° C. is provided. This so-called hybrid connection is capable of increasing the efficiency of the installation up to 60%, with, as must be understood, minimized pollutant emissions from the required quantity of fossil fuels now minimized by the use of the high-temperature reactor 12.

The compressor-dependent pressure drop of the gas turbine 5 can be increased by means of an injector acting immediately upstream of the gas turbine, the pre-compressed air from the compressor or compressors flowing through the inlet nozzle thereof. The ejector nozzle of the injector is charged by at least a part of the steam 15 arising in the waste heat boiler 13, whereby the compressed air is further compressed without taking up power from the yield of the gas turbine 5. The injector can also be placed upstream of the combustion chamber 8, here again the ejector nozzle of the injector being charged by at least a part of the steam 15 arising in the waste heat boiler 13. Depending on the installation, the injector can also be placed downstream of the combustion chamber 8: in such a case, the ejector nozzle of the injector is charged by the hot gases processed in the combustion chamber 8.

The combustion chamber 8 can be an isochoric combustion chamber, in which case this type of combustion can be provided by a pressure wave machine, or the combustion chamber can be a constant-pressure combustion chamber.

Obviously, numerous modifications and variations of the present invention are possible in the light of the above teachings. It is therefore to be understood that, within the scope of the appended claims, the invention may be practiced otherwise than as specifically described herein.

What is claimed is:
1. A hybrid nuclear/fossil power plane comprising:
a gas turbine group comprising:

a compressor unit for compressing air, the compressor unit comprising a first stage compressor, a first heat exchanger for cooling air compressed in the first stage compressor, and a second stage compressor downstream of the cooler;

a second heat exchanger downstream of the compressor unit for heating the compressed air;

a combustion chamber downstream of the heat exchanger for further heating the compressed air;

a turbine downstream of the combustion chamber; and, a generator driven by the turbine;

a high-temperature reactor circuit operatively connected to the second heat exchanger to supply heat to the second heat exchanger; and, a stream turbine circuit comprising:

a waste heat boiler for generating stream from exit gases of the gas turbine;

a steam turbine downstream of the waste heat boiler; and, means for recirculating condensate from the steam turbine to the waste heat boiler.

2. The power station installation as claimed in claim 1, wherein the high-temperature reactor (12) is a component of a closed cycle, and the heat exchanger (7) is the heat sink of this cycle.

3. The power station installation as claimed in claim 1, wherein an injector is placed in the gas turbine group, and at least a part of the steam (15) arising in the waste heat boiler (13) can be charged to the ejector nozzle of the injector.

4. The power station installation as claimed in claim 3, wherein the injector is placed upstream of the combustion chamber (8).

5. The power station installation as claimed in claim 1, wherein the injector is placed downstream of the combustion chamber (8), and the hot gases processed in the combustion chamber (8) can be charged to the ejector nozzle of the injector.

6. The power station installation as claimed in claim 1, wherein the medium (10) is helium.

7. The power station installation as claimed in claim 1, wherein the medium (10) is sodium.

8. The power station installation as claimed in claim 1, wherein the medium (10) is carbon dioxide.

9. A process for operating a power station installation as claimed in claim 1, wherein the compressed air undergoes caloric processing up to 950° C. in the heat exchanger (7) upstream of the combustion chamber (8), and the same working gases are heated up to 1200° C. in the combustion chamber (8).

10. The process as claimed in claim 9, wherein the heat sink in the heat exchanger (7) is at 600°–700° C.

* * * * *